(12) United States Patent
Liang et al.

(10) Patent No.: US 11,609,561 B2
(45) Date of Patent: Mar. 21, 2023

(54) VALUE BALANCING FOR OIL OR GAS DRILLING AND RECOVERY EQUIPMENT USING MACHINE LEARNING MODELS

(71) Applicant: Halliburton Energy Services, Inc., Houston, TX (US)

(72) Inventors: Bo Liang, Houston, TX (US); Yanyan Wu, Houston, TX (US); Daili Zhang, Kingwood, TX (US); Chao Yang, Houston, TX (US); Meng Zhang, Sugar Land, TX (US); Fahad Ahmad, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 205 days.

(21) Appl. No.: 16/916,318

(22) Filed: Jun. 30, 2020

(65) Prior Publication Data
US 2021/0149386 A1   May 20, 2021

Related U.S. Application Data

(60) Provisional application No. 62/935,672, filed on Nov. 15, 2019.

(51) Int. Cl.
| | |
|---|---|
| *G05B 23/02* | (2006.01) |
| *G06N 5/02* | (2023.01) |
| *G06N 20/00* | (2019.01) |

(52) U.S. Cl.
CPC .......... *G05B 23/0283* (2013.01); *G06N 5/02* (2013.01); *G06N 20/00* (2019.01)

(58) Field of Classification Search
CPC ...... G05B 23/0283; G06N 20/00; G06N 5/02; G06Q 10/04
See application file for complete search history.

(56) References Cited

U.S. PATENT DOCUMENTS

| | | | |
|---|---|---|---|
| 7,653,512 B2 | 1/2010 | Cheung et al. | |
| 11,138,816 B1 * | 10/2021 | Bechhoefer | ............ G07C 5/085 |

(Continued)

FOREIGN PATENT DOCUMENTS

| | | | |
|---|---|---|---|
| CN | 112149833 A | * | 12/2020 |
| EP | 2440784 | | 4/2012 |
| JP | 2009086896 A | * | 4/2009 |

OTHER PUBLICATIONS

PCT Application No. PCT/US2020/040219 , International Search Report and Written Opinion, dated Oct. 7, 2020, 10 pages.

(Continued)

*Primary Examiner* — Alicia M. Choi

(74) *Attorney, Agent, or Firm* — Kilpatrick Townsend & Stockton LLP

(57) ABSTRACT

The value for equipment to be replaced can be maximized by determining a threshold cutoff value for a failure prediction indicator and a window size for obtaining the threshold cutoff value for a piece of oil or gas drilling or recovery equipment; applying the threshold cutoff value and the window size to an equipment failure prediction model; and deriving a recall value and an average hour-loss value from the equipment failure prediction model. Predictive maintenance for the piece of oil or gas drilling or recovery equipment may be performed based on the recall value and the average hour-loss value to perform predictive maintenance for a piece of equipment in an oil or gas recovery operation.

20 Claims, 4 Drawing Sheets

(56) References Cited

U.S. PATENT DOCUMENTS

| | | | |
|---|---|---|---|
| 2003/0216888 A1* | 11/2003 | Ridolfo | G05B 23/0283 702/181 |
| 2005/0234718 A1* | 10/2005 | Ouimet | G06Q 30/0202 704/241 |
| 2006/0111857 A1* | 5/2006 | Shah | G01D 1/00 702/85 |
| 2008/0250265 A1* | 10/2008 | Chang | G06F 11/0751 714/4.12 |
| 2011/0060568 A1* | 3/2011 | Goldfine | G07C 3/00 702/34 |
| 2011/0225111 A1 | 9/2011 | Ringer | |
| 2013/0080117 A1 | 3/2013 | Liu et al. | |
| 2013/0110761 A1* | 5/2013 | Viswanathan | G06F 16/24578 706/52 |
| 2014/0278302 A1 | 9/2014 | Ziegel et al. | |
| 2015/0356450 A1 | 12/2015 | Dursun et al. | |
| 2017/0328194 A1 | 11/2017 | Liu et al. | |
| 2017/0343693 A1* | 11/2017 | Walker | E21B 49/00 |
| 2017/0364795 A1 | 12/2017 | Anderson et al. | |
| 2018/0149019 A1 | 5/2018 | Bose et al. | |
| 2019/0354541 A1* | 11/2019 | Evrard | G06F 16/287 |
| 2020/0056470 A1* | 2/2020 | Ng | E21B 19/06 |
| 2020/0057689 A1* | 2/2020 | Farahat | G06F 11/0751 |
| 2020/0164517 A1* | 5/2020 | Dick | G06N 3/0454 |
| 2020/0387818 A1* | 12/2020 | Chan | G06F 17/18 |
| 2021/0062619 A1* | 3/2021 | Camacho Cardenas | G05B 13/048 |
| 2021/0149386 A1* | 5/2021 | Liang | G05B 23/0283 |
| 2021/0232731 A1* | 7/2021 | Wang | H02J 3/386 |
| 2022/0170359 A1* | 6/2022 | Boualleg | G06N 20/20 |

OTHER PUBLICATIONS

SHTIUI, "Cost-Benefit Analysis Using Machine Learning in Power B1", Jun. 24, 2019, 7 pages.

* cited by examiner

VALUE BALANCING FOR OIL OR GAS DRILLING AND RECOVERY EQUIPMENT USING MACHINE LEARNING MODELS

CROSS-REFERENCE TO RELATED APPLICATIONS

This claims priority to U.S. Provisional Patent Application No. 62/935,672, filed on Nov. 15, 2019, and titled "Value Balancing for Oil or Gas Recovery Equipment Using Machine Learning and Deep Learning Models," the disclosure of which is hereby incorporated by reference in its entirety.

TECHNICAL FIELD

The present disclosure relates generally to analyzing failures of equipment used for oil and gas drilling and recovery operations. More specifically, but not by way of limitation, this disclosure relates to using a machine-learning model for predicting failures of oil and gas drilling and recovery equipment.

BACKGROUND

Oil and gas drilling and recovery processes operate in environments involving many variables such as porosity of the rock in a formation, the viscosity of the deposit, etc. These variables can impact maintenance and failure of equipment used in the processes as well as impacting production time and cost of the oil and gas recovery processes. Conventional solutions assume average behavior of equipment rather than tracking behavior of individual pieces of equipment and may not be accurate. A machine-learning model for predicting equipment failure can either predict run-to-failure, which can lead to an increase in non-productive time (NPT) cost and customer dissatisfaction, or predict equipment failure well before actual failure, which can result in increased cost from replacing equipment before the end of its useful life.

DETAILED DESCRIPTION

Certain aspects and features relate to applying customized value analysis to failure predictions generated by a machine-learning model or a deep learning model to maximize the value for oil and gas drilling and recovery equipment to be replaced. The machine learning model, also referred to herein as a deep learning model, may be trained on historical equipment failure data to predict equipment failures, and additional features may be implemented for the model.

The additional features may include applying a cost function for the piece of equipment being analyzed, adding a customized evaluation metric to improve performance of the model, and introducing a value and cost to the equipment failure predictions generated by the model. The cost function may provide a value for a piece of equipment. The evaluation metric may provide a threshold for determining an equipment failure. Introduction of the value and cost to the equipment failure predictions may take into account the cost associated with missing a failure prediction and the cost associated with predicting a failure too early.

Each piece of equipment in use can have a unique remaining useful life. The piece of equipment may run-to-failure, which can lead to an increase in non-productive time (NPT) cost and customer dissatisfaction, or the equipment may be replaced too early prior to failure, which can result in lost money from unused equipment life. When applied to oil and gas drilling and recovery equipment (e.g., engines, transmissions, centrifugal pumps, etc.), the machine-learning model failure predictions enhanced by above features the may achieve significant savings by minimizing NPT costs and maximizing usage of the equipment over its useful life.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
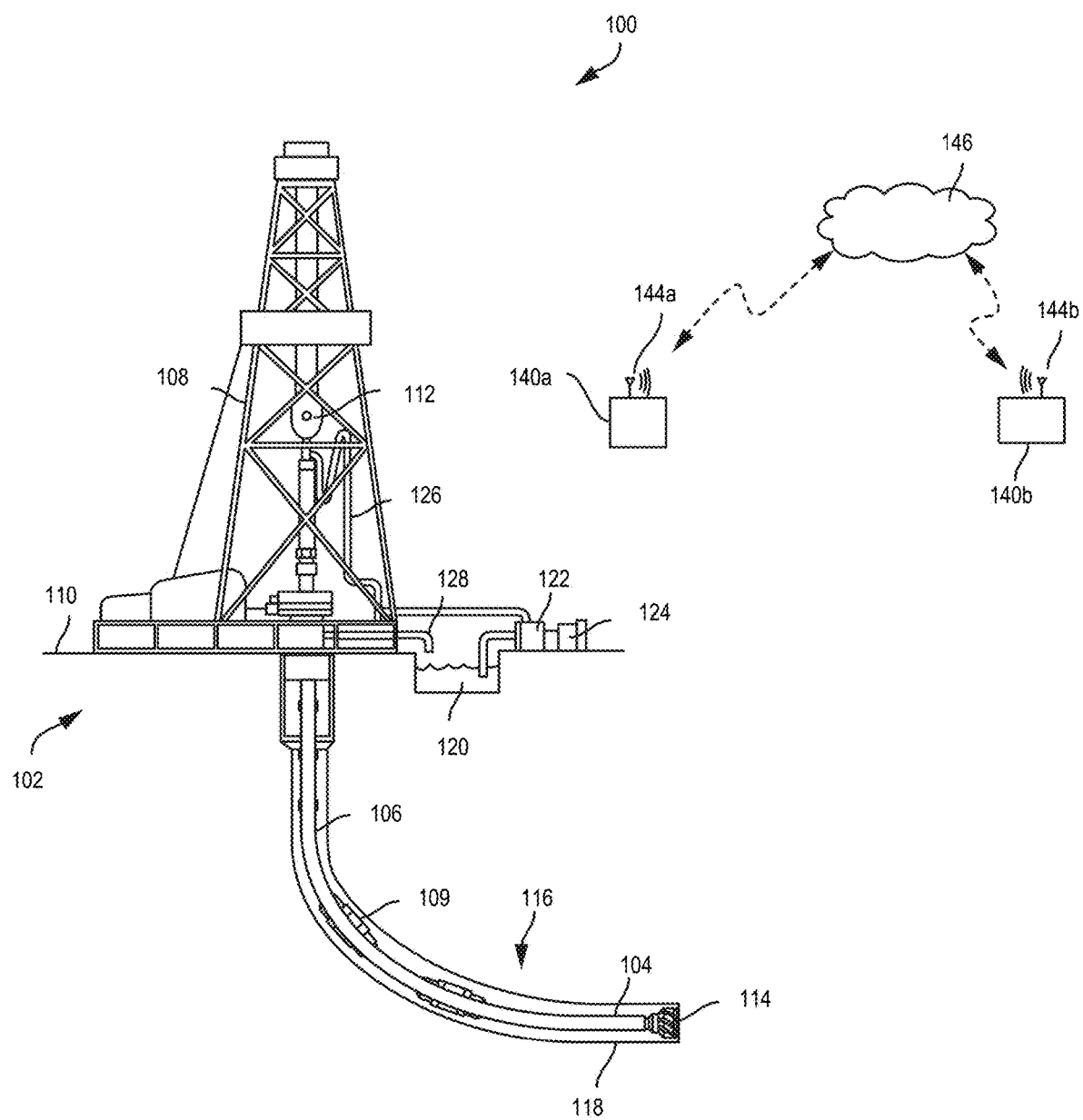
FIG. 1 is a cross-sectional schematic view of an example of a drilling system illustrating equipment used in oil and gas drilling processes according to some aspects of the present disclosure.

FIG. 1 is a cross-sectional side view of an example of a drilling system 100 illustrating examples of some equipment used in oil and gas recovery processes. Referring to FIG. 1, a wellbore of the type used to extract hydrocarbons from a formation may be created by drilling into the earth 102 using the drilling system 100. The drilling system 100 may be configured to drive a bottom hole assembly (BHA) 104 positioned or otherwise arranged at the bottom of a drillstring 106 extended into the earth 102 from a derrick 108 arranged at the surface 110. The BHA 104 may include a steering mechanism to enable adjustments to the drilling direction. For example, the steering mechanism may enable horizontal drilling of the wellbore. The derrick 108 includes a kelly 112 used to lower and raise the drillstring 106. The BHA 104 may include a drill bit 114 operatively coupled to a tool string 116, which may be moved axially within a drilled wellbore 118 as attached to the drillstring 106.

Tool string 116 may include one or more tool joints 109 which may further include sensors (not shown) for monitoring conditions in the wellbore, for example, but not limited to, rock porosity, absolute and relative permeabilities of formations, effective hydraulic diameter, of the wellbore, etc. The combination of any support structure (in this example, derrick 108), any motors, electrical equipment, and support for the drillstring and tool string may be referred to herein as a drilling arrangement. Additional sensors (not shown) may be disposed on the drilling arrangement (e.g., on the wellhead) to monitor process parameters, for example, but not limited to, production fluid viscosity, density, etc. It should be appreciated that the parameters and conditions mentioned above do not form an exhaustive list and that other parameters and conditions may be monitored without departing from the scope of the present disclosure.

During operation, the drill bit 114 penetrates the earth 102 and thereby creates the wellbore 118. The BHA 104 provides control of the drill bit 114 as it advances into the earth 102. Drilling fluid, or "mud," from a mud tank 120 may be pumped downhole using a mud pump 122 powered by an adjacent power source, such as a prime mover or motor 124. The drilling fluid may be pumped from the mud tank 120, through a stand pipe 126, which feeds the drilling fluid into the drillstring 106 and conveys the drilling fluid to the drill bit 114. The drilling fluid exits one or more nozzles (not shown) arranged in the drill bit 114 and in the process cools the drill bit 114. After exiting the drill bit 114, the drilling fluid circulates back to the surface 110 via the annulus defined between the wellbore 118 and the drillstring 106, and in the process returns the drill cuttings and debris to the surface. The cuttings and drilling fluid mixture are passed through a flow line 128 and are processed such that a cleaned drilling fluid is returned down hole through the stand pipe 126 once again. Drilling fluid samples drawn from the mud tank 120 may be analyzed to determine the characteristics of the drilling fluid and any adjustments to the drilling fluid chemistry that should be made.

Sensors and/or instrumentation related to operation of the drilling system 100 may be connected to a computing device 140a. In various implementations, the computing device 140a may be deployed in a work vehicle, may be permanently installed with the drilling system 100, may be handheld, or may be remotely located. In some examples, the computing device 140a may process at least a portion of the data received and may transmit the processed or unprocessed data to a remote computing device 140b via a wired or wireless network 146. The remote computing device 140b may be offsite, such as at a data-processing center. The remote computing device 140b may receive the data, execute computer program instructions to analyze the data, and communicate the analysis results to the computing device 140a.

Each of the computing devices 140a, 140b may include a processor interfaced with other hardware via a bus. A memory, which may include any suitable tangible (and non-transitory) computer-readable medium, such as RAM, ROM, EEPROM, or the like, can embody program components that configure operation of the computing devices 140a, 140b. In some aspects, the computing devices 140a, 140b may include input/output interface components (e.g., a display, printer, keyboard, touch-sensitive surface, and mouse) and additional storage.

The computing devices 140a, 140b may include communication devices 144a, 144b. The communication devices 144a, 144b may represent one or more components that facilitate a network connection. In the example shown in FIG. 1, the communication devices 144a, 144b are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 144a, 144b may use acoustic waves, surface waves, vibrations, optical waves, or induction (e.g., magnetic induction) for engaging in wireless communications. In other examples, the communication devices 144a, 144b may be wired and can include interfaces such as Ethernet, USB, IEEE 1394, or a fiber optic interface. The computing devices 140a, 140b may receive wired or wireless communications from one another and perform one or more tasks based on the communications. While FIG. 1 illustrates equipment in a drilling system, methods and systems of the present disclosure may be applied to failure prediction and replacement of equipment utilized in all phases of hydrocarbon production (e.g., well drilling, well completion, recovery and production).

Figure 2:
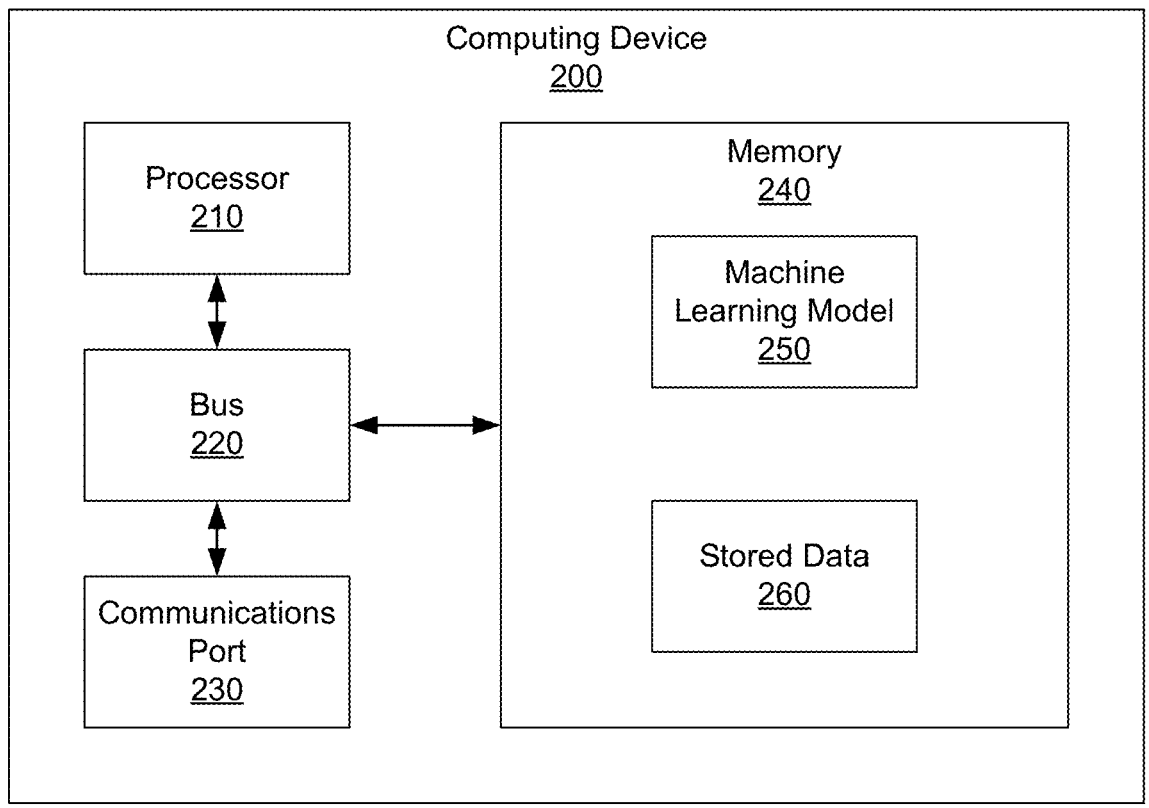
FIG. 2 is a block diagram of a computing device for implementing various examples of the enhanced machine-learning model according to some aspects of the present disclosure.

FIG. 2 is a block diagram of a computing device for implementing various examples of the enhanced machine-learning model according to some aspects of the present disclosure. The computing device 200 can include a processor 210, a bus 220, a communications port 230, and a memory 240. In some examples, the components shown in FIG. 2 (e.g., the processor 210, the bus 220, the communications port 230, and the memory 240) can be integrated into a single structure. For example, the components can be within a single housing. In other examples, the components shown in FIG. 2 can be distributed (e.g., in separate housings) and in electrical communication with each other.

The processor 210 can execute one or more operations for implementing some examples of the present disclosure for optimizing equipment value. The processor 210 can execute instructions stored in the memory 240 to perform the operations. The processor 210 can include one processing device or multiple processing devices. Non-limiting examples of the processor 210 include a Field-Programmable Gate Array ("FPGA"), an application-specific integrated circuit ("ASIC"), a microprocessor, etc.

The processor 210 can be communicatively coupled to the memory 240 via the bus 220. The non-volatile memory 240 may include any type of memory device that retains stored information when powered off. Non-limiting examples of the memory 240 include electrically erasable and programmable read-only memory ("EEPROM"), flash memory, or any other type of non-volatile memory. In some examples, at least some of the memory 240 can include a medium from which the processor 210 can read instructions. A computer-readable medium can include electronic, optical, magnetic, or other storage devices capable of providing the processor 210 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The communications port 230 can be used to communicate with the external systems or devices, such as sensors gathering data in a wellbore environment. Sensor data received by the communications port 230 can be transmitted to the memory 240 via the bus 220. The memory 240 can store any sensor data as stored data 260 for implementing some examples.

The memory 240 can include program code for a machine-learning model 250 that can be executed for causing the computing device to perform operations according to various examples of the present disclosure.

In some aspects, apparatuses, systems, and methods for value balancing for oil or gas recovery equipment using machine-learning and deep learning models are provided according to one or more of the following examples.

According to some aspects of the present disclosure, the value for oil and gas recovery equipment to be replaced may be maximized using customized value analysis applied to failure predictions for the equipment generated by a machine-learning model. The customized value analysis may balance tradeoffs between model precision and recall accuracy. The precision of a model may be determined as the number of true positives divided by the number of true positives plus the number of false positives, as shown in Equation 1. True positives are data points classified as positive by the model that actually are positive (e.g., they are correct). False positives are data points the model incorrectly labeled as positive that are actually negative data points.

$$\text{precision} = \frac{\text{true positives}}{\text{true positives} + \text{false positives}} \quad \text{Eq. (1)}$$

Recall accuracy is the ability of a model to find all the relevant data points within a dataset. Recall accuracy may be determined as the number of true positives divided by the number of true positives plus the number of false negatives, as shown in Equation 2. False negatives are data points the model identifies as negative that actually are positive (e.g., they are incorrect).

$$\text{recall accuracy} = \frac{\text{true positives}}{\text{true positives} + \text{false negatives}} \quad \text{Eq. (2)}$$

The customized value analysis may resolve issues associated with competing metrics for maximizing the value of equipment. When tradeoffs are made between the model precision and the recall accuracy, increasing one metric (e.g., the model precision) may result in a decrease in the other metric (e.g., the recall accuracy). For example, when building a failure prediction model for equipment, the model can either run-to-failure, which may lead to an increase in non-productive time (NPT) cost and customer dissatisfaction, or the model can predict failure earlier, which may result in lost money from unused equipment life.

To resolve these failure prediction issues, several aspects may be implemented with the machine-learning model. One aspect may involve applying a cost function on a physical target, for example, a piece of equipment, being analyzed. The cost function may provide a value for a piece of equipment. Another aspect may involve improving a machine-learning model by adding a customized evaluation metric that optimizes model performance. The customized evaluation metric may include an equipment failure threshold determined from smoothed data. Yet another aspect may involve introduction of a value and cost to the model and focusing on maximizing the business impact that the model can generate. For example, the value and cost may use the cost of a failed prediction (e.g., from a reduced model precision) and lost value associated with improving recall accuracy. This aspect may be contrary to traditional approaches that only focus on improving accuracy, recall, or an F-1 score of the model. The term "F-1 score" may refer to a particular measure of the accuracy of the model as a harmonic mean of both precision and recall. When applied to oil and gas drilling and recovery equipment (e.g., engines, transmissions, centrifugal pumps, etc.), the enhanced deep learning model or enhanced machine-learning model may achieve significant savings by minimizing NPT costs and maximizing usage of the equipment life.

Each piece of equipment in use has a unique remaining useful life. The remaining useful life may be dependent upon equipment operating conditions, for example, pressure, temperature, speed, load, etc., as well as the type of jobs (e.g., pumping, drilling, etc.) for which the equipment is utilized.

Data related to the operating conditions and job types may be collected for each piece of equipment and used to generate features for input to the machine-learning model. Additional historical data, for example, length of run time, conditions under which the equipment has been running, etc., may also be obtained. The machine-learning model may then predict the remaining useful life for a piece of equipment. The data for a piece of equipment may be aggregated and averaged, and useful features may be extracted, for example, using a sliding window technique.

The method may apply a cost function on a physical target (e.g., equipment being analyzed) taking into account a cost associated with missing a failure prediction of the equipment (i.e., running to failure) and a cost associated with improving recall of the equipment (e.g., predicting a failure too early leading to unused asset life). Failure predictions may be generated by the machine-learning model based on time series data for a piece of equipment. The prediction data may be smoothed using a sliding window, and a threshold cutoff value for failure may be determined from the smoothed data. Based on the predicted failure, a cost in terms of monetary value resulting from non-productive time when a piece of equipment fails may be balanced against an allocated running cost per hour (e.g., based on capital expenditure) to determine an optimum time in terms of value for replacing the equipment.

According to some aspects of the present disclosure, data related to the operation of a piece of equipment may be collected and processed to generate features for the machine-learning model. The data may be aggregated, for example, averaged based on a sliding window, and features relevant to failure prediction may be extracted. For example, the temperature in a chamber of a piece of equipment (e.g., a pressure pumping unit) may be monitored. The temperature may be indicative of the health of the equipment under the running conditions. When the monitored chamber temperature exceeds a specified temperature, the time and temperature exceeding the specified temperature may be accumulated. Similarly, the actual running pressure of the equipment may be compared to a typical profile of the job-required pressure. Data for time and pressure falling outside the job-required pressure profile may be accumulated. Historical data may be applied to determine whether differences between the actual running pressure of the equipment and the job-required profiles are changing.

The processed data may be applied to the machine-learning model that has been trained and cross-validated. The presently disclosed method may improve a machine-learning model by adding a customized evaluation metric to optimize the impact and performance of the model. Windowing may be applied to smooth the prediction results generated by the model. Different window sizes may be applied to determine the appropriate window size for obtaining a prediction threshold cutoff value. The threshold cutoff value may be a failure probability value, a predicted remaining useful life, or another metric. In some implementations, the threshold cutoff value may be moving average of the prediction results. A probability of failure prediction exceeding a failure probability threshold cutoff value may be considered as a predicted failure. Similarly, a predicted remaining useful life that falls below a useful life threshold may be considered as a predicted a failure.

A cost function may be applied to the piece of equipment being analyzed. The cost function may be used for balancing a cost associated with missing a failure prediction such that the piece of equipment runs to failure and a cost associated with predicting a failure too early that leads to unused asset life. Various cost functions may be specified for various types of equipment. Enhancing the machine-learning model with the customized evaluation metric and cost balancing can improve the timing and value of predictive equipment maintenance (i.e., equipment replacement).

Figure 3:
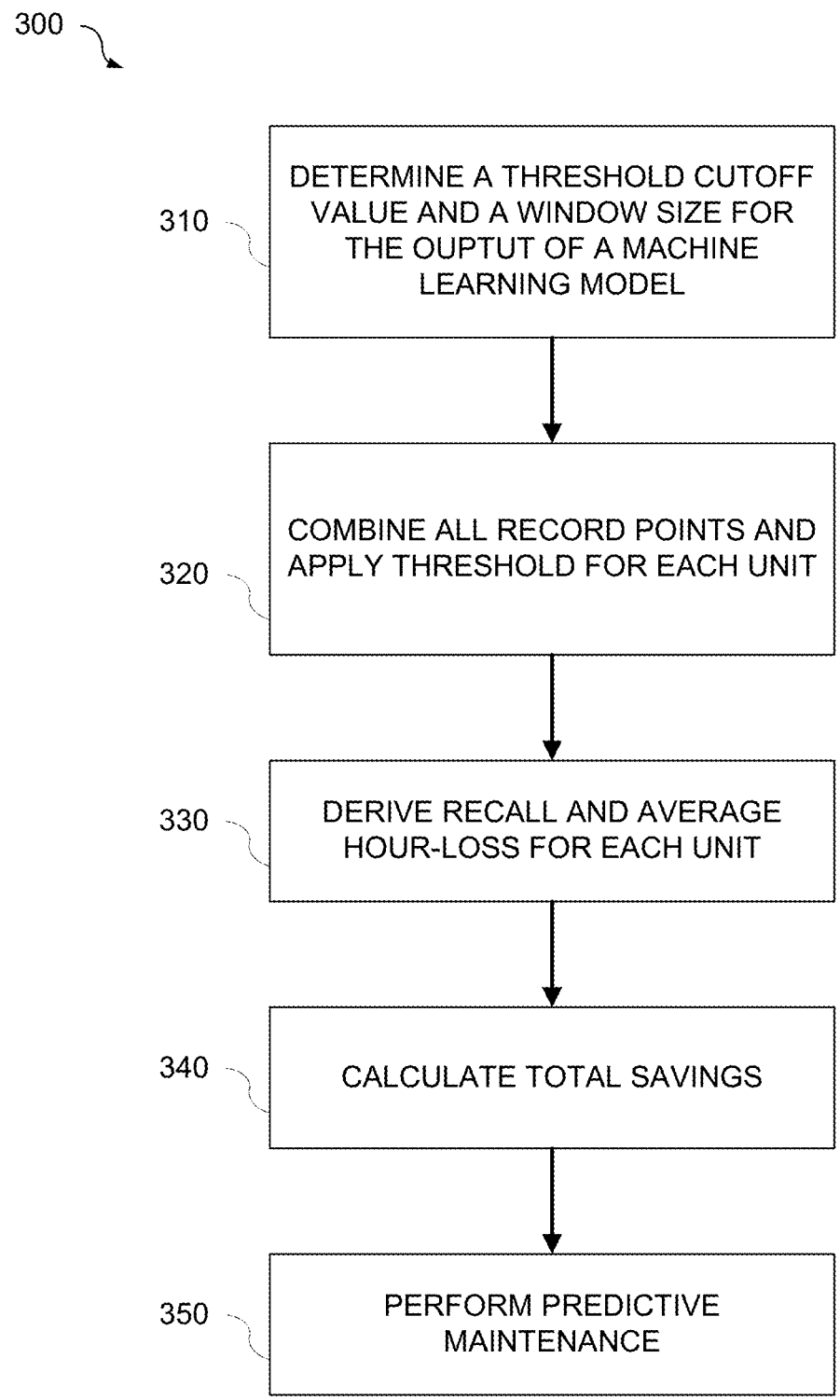
FIG. 3 is a flowchart of an example of a process for implementing the enhanced machine-learning model as an oil or gas drilling and recovery equipment failure prediction model according to some aspects of the present disclosure.

FIG. 3 is a flowchart of an example of a process 300 for implementing the enhanced machine-learning model as a drilling and recovery equipment failure prediction model according to some aspects of the present disclosure. The process may be applied to an overall piece of equipment or a sub-system of the piece of equipment. In this example, a scope may be a number of equipment units. For each unit, continuously sampled time series records are fed into the machine-learning model, and the output is an estimated remaining useful life of the equipment.

At block 310, a threshold cutoff value and a window size from an output of the machine-learning model may be determined. For each time series record for a piece of equipment that is fed into the machine-learning model, the machine-learning model may output a prediction of the remaining useful life of the equipment of the piece of equipment. A sliding window may be used to smooth the output of the machine-learning model data and extract a metric. For example, the sliding window may be used to extract a moving average or another metric. The sliding window may be a fixed size window or a dynamically sized window. The size of the sliding window may be determined to smooth the prediction results. The threshold cutoff value may be determined from the extracted metric. The threshold cutoff value may be a probability value, a specified time of remaining useful life, or another value. The threshold cutoff value and a window size may be added to the hyperparameters for cross validation of the model.

At block 320, each equipment unit identified in a test set may be processed by combining all continuously sampled time series record points and applying the threshold cutoff value to the record points. If the record points exceed the threshold, the equipment is considered to have reached a failure state.

At block 330, a recall value (e.g., a failure catch percentage) and an average hour-loss value are derived for each equipment unit. The recall value may be used to evaluate whether the machine-learning model is capable of predicting a failure of the equipment. The average hour-loss value may represent a monetary value of an average time difference between a predicted time of equipment failure and an actual time of the equipment failure.

At block 340, a total savings of the enhanced model is calculated from a savings of the predicted failure and a monetary loss due to an amount of the equipment life that is not utilized. The monetary loss may be calculated using a linear equipment depreciation rate or an accelerated depreciation rate. In some examples, the savings associated with improving prediction accuracy may result from prevention of lost asset value, avoidance of extra time or money spent resolving equipment failure, gaining productivity or revenue by avoiding equipment failure, or any combination thereof. Further, the benefit of improving recall (or increasing the ability of the machine-learning model to predict equipment failure) can increase asset investment, avoid expenditures of extra money and time, and decrease lost revenue by avoiding the equipment reaching a failure state. A cost in terms of monetary value resulting from non-productive time when a piece of equipment fails may be balanced against an allocated running cost per hour (e.g., based on capital expenditure) to determine a time in terms of value for replacing the equipment.

At block 350, predictive maintenance may be performed for the piece of equipment. For example, using the results of the model, it may be determined that a piece of equipment should be replaced based on the cost of a complete failure compared to the lost operational value of replacing the piece of equipment at the predicted time.

The method of FIG. 3 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

The specific steps illustrated in FIG. 3 provide a particular method for implementing the enhanced model as an equipment failure prediction model according to an example of the present disclosure. Other sequences of steps may also be performed according to alternative examples. For example, alternative examples of the present disclosure may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. Many variations, modifications, and alternatives can be recognized.

Figure 4:
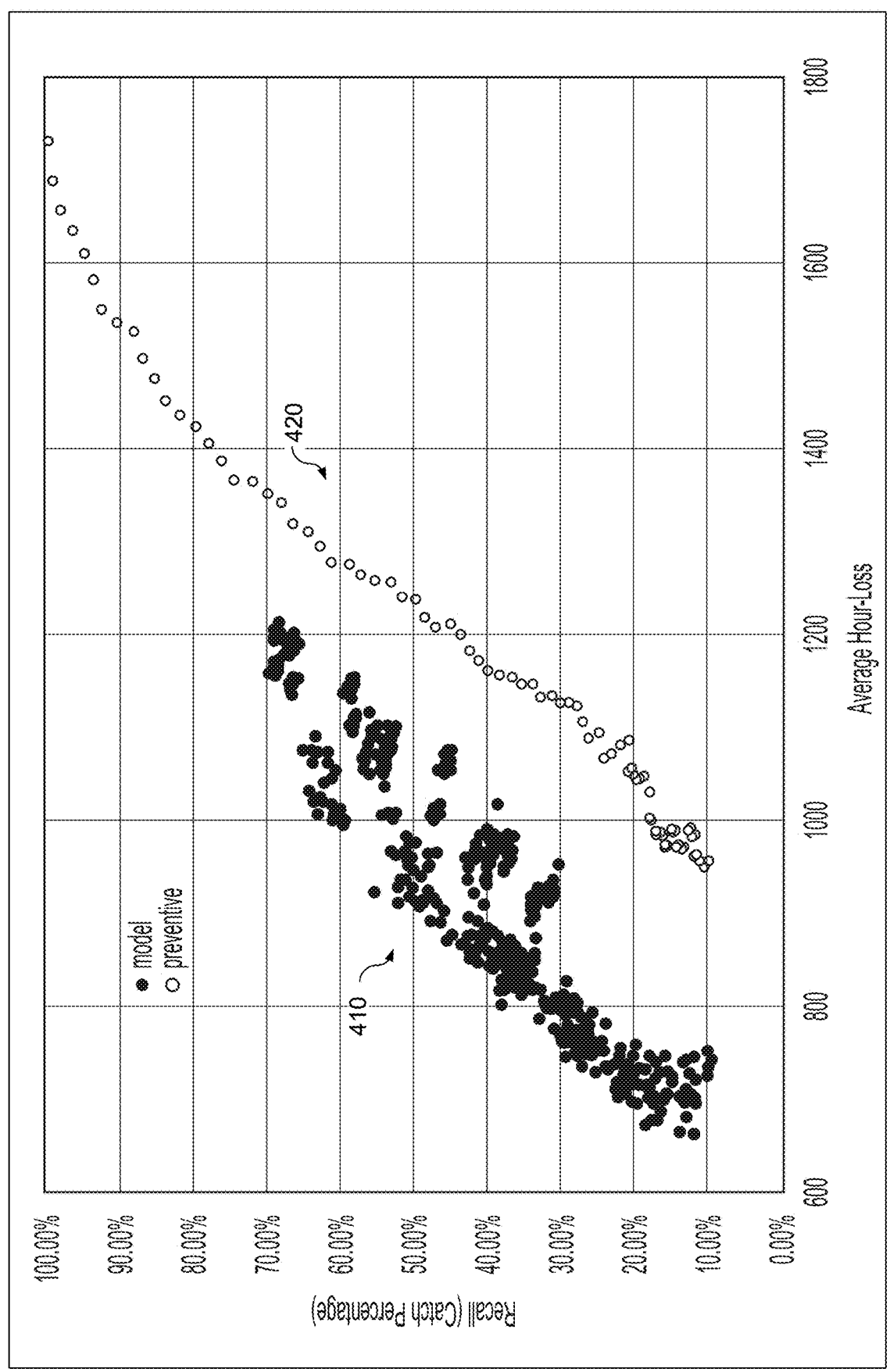
FIG. 4 is a graphical representation of an example of oil or gas drilling and recovery equipment failure prediction performance of the enhanced model according to some aspects of the present disclosure.

FIG. 4 is a graphical representation of an example of oil or gas drilling and recovery equipment failure prediction performance of the enhanced model according to some aspects of the present disclosure. As illustrated, the graphical representation shows results of the enhanced model 410 compared with results of a schedule-based preventive technique 420. The schedule-based preventive technique 420 was optimized toward an F-1 score in terms of making tradeoffs between precision and recall.

The results include an indication of recall (e.g., failure catch percentage) over an indication of average hour-loss for an equipment unit. The average hour-loss represents an average number of hours that are lost for an equipment unit due to replacing the equipment unit prior to a usable life expiring (e.g., prior to reaching a failure state). Further, the recall value indicates a likelihood, as a percentage, of detecting a failure state before the failure state is reached. As shown in FIG. 4, the enhanced model 410 can significantly reduce the average hours lost due to replacing the equipment unit before the end of its usable life across all recall percentages when compared to a preventive technique 420. For example, a failure catch percentage of 30% for the enhanced model 410 can result in an average hour-loss of approximately 800 compared to an average hour-loss of over 1100 for the preventive technique 420.

The enhanced machine-learning model may be optimized toward business value. For example, tradeoffs may be balanced with benefits of improving one metric and limiting cost penalties associated with another metric. In addition to the benefit and penalty that are built into the model, parameters are also implemented in the machine-learning model that provide cross validation to maximize a value of the machine-learning model. Further, the disclosed approach may fully embed the value optimization into the machine-learning model rather than implement value optimization in an ad hoc manner after completion of the model.

In some aspects, a system and method for using a machine-learning model for predicting failures of oil and gas recovery equipment are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a system including a processing device; and a memory device that includes instructions executable by the processing device for causing the processing device to: determine a threshold cutoff value for a failure prediction indicator and a window size for obtaining the threshold cutoff value for a piece of oil or gas drilling or recovery equipment; apply the threshold cutoff value and the window size to an equipment failure prediction model; derive a recall value and an average hour-loss value from the equipment failure prediction model; and perform predictive maintenance for the piece of oil or gas drilling or recovery equipment based on the recall value and the average hour-loss value.

Example 2 is the system of example(s) 1, wherein the memory device further includes instructions for causing the processing device to extract input features for the equipment failure prediction model that are identified as predictors of equipment failure from operational data of the piece of equipment.

Example 3 is the system of example(s) 1-2, wherein the failure prediction indicator includes a value for probability of failure of the piece of equipment or a value for remaining useful life of the piece of equipment.

Example 4 is the system of example(s) 1-3, wherein the window size is determined to generate a stable value for the threshold cutoff value used to train the equipment failure prediction model.

Example 5 is the system of example(s) 1-4, wherein the equipment failure prediction model includes a machine-learning model that relates the recall value to the average hour-loss value to determine financial losses due to equipment failure.

Example 6 is the system of example(s) 1-5, wherein the average hour-loss value includes a value for equipment running time lost between predicted failure of the piece of equipment and actual failure of the piece of equipment.

Example 7 is the system of example(s) 1-6, wherein the recall value includes accuracy of the equipment failure prediction model in predicting equipment failures.

Example 8 is a method including: determining a threshold cutoff value for a failure prediction indicator and a window size for obtaining the threshold cutoff value for a piece of oil or gas drilling or recovery equipment; applying the threshold cutoff value and the window size to an equipment failure prediction model; deriving a recall value and an average hour-loss value from the equipment failure prediction model; and performing predictive maintenance for the piece of oil or gas drilling or recovery equipment based on the recall value and the average hour-loss value to perform predictive maintenance for a piece of equipment in an oil or gas recovery operation.

Example 9 is the method of example(s) 8, further including: extracting input features for the equipment failure prediction model that are identified as predictors of equipment failure from operational data of the piece of equipment.

Example 10 is the method of example(s) 8-9, wherein the failure prediction indicator includes a value for probability of failure of the piece of equipment or a value for remaining useful life of the piece of equipment.

Example 11 is the method of example(s) 8-10, wherein the window size is determined to generate a stable value for the threshold cutoff value used to train the equipment failure prediction model.

Example 12 is the method of example(s) 8-11, wherein the equipment failure prediction model includes a machine-learning model that relates the recall value to the average hour-loss value to determine financial losses due to equipment failure.

Example 13 is the method of example(s) 8-12, wherein the average hour-loss value includes a value for equipment running time lost between predicted failure of the piece of equipment and actual failure of the piece of equipment.

Example 14 is the method of example(s) 8-13, wherein the recall value includes accuracy of the equipment failure prediction model in predicting equipment failures.

Example 15 is a non-transitory computer-readable medium having stored therein instructions for making one or more processors execute a method, the processor executable instructions including instructions for performing operations including: determining a threshold cutoff value for a failure prediction indicator and a window size obtaining the threshold cutoff value for a piece of oil or gas drilling or recovery equipment; applying the threshold cutoff value and the window size to an equipment failure prediction model; deriving a recall value and an average hour-loss value from the equipment failure prediction model; and performing predictive maintenance for the piece of oil or gas drilling or recovery equipment based on the recall value and the average hour-loss value.

Example 16 is the non-transitory computer-readable medium as defined in example(s) 15, further including instructions for performing operations including: extracting input features for the equipment failure prediction model that are identified as predictors of equipment failure from operational data of the piece of equipment.

Example 17 is the non-transitory computer-readable medium as defined in example(s) 15-16, wherein the failure prediction indicator includes a value for probability of failure of the piece of equipment or a value for remaining useful life of the piece of equipment.

Example 18 is the non-transitory computer-readable medium as defined in example(s) 15-17, wherein the window size is determined to generate a stable value for the threshold cutoff value used to train the equipment failure prediction model.

Example 19 is the non-transitory computer-readable medium as defined in example(s) 15-18, wherein the equipment failure prediction model includes a machine-learning model that relates the recall value to the average hour-loss value to determine financial losses due to equipment failure.

Example 20 is the non-transitory computer-readable medium as defined in example(s) 15-19, wherein the average hour-loss value comprises a value for equipment running time lost between predicted failure and actual failure of the piece of equipment, and the recall value includes accuracy of the equipment failure prediction model in predicting equipment failures.

The foregoing description of certain embodiments, including illustrated embodiments, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:
1. A system comprising:
a processor; and
a memory that includes instructions executable by the processor for causing the processor to:
process time series data related to operation of a piece of oil or gas drilling or recovery equipment using a first sliding window to generate processed data including features relevant to failure prediction;
apply the processed time series data to an equipment failure prediction model;
determine a threshold cutoff value for a feature relevant to failure prediction for the piece of oil or gas drilling or recovery equipment by extracting a metric using a second sliding window to smooth an output of the equipment failure prediction model,
wherein the threshold cutoff value is determined based on the metric;
apply the threshold cutoff value to the output of the equipment failure prediction model to train the equipment failure prediction model;
derive a recall value and an average hour-loss value from the trained equipment failure prediction model;
cross validate the trained equipment failure prediction model with an embedded value optimization using a cost associated with running the piece of oil or gas drilling or recovery equipment to failure and a cost of predicting a failure too early that leads to unused life of piece of oil or gas drilling or recovery equipment; and
identify a predictive maintenance to be performed and a time for performing the predictive maintenance based on a prediction of equipment failure, wherein the identified predictive maintenance for the piece of oil or gas drilling or recovery equipment and the time to perform the identified predictive maintenance is based on the prediction of equipment failure by the cross validated and trained equipment failure prediction model.

2. The system of claim 1, wherein the memory further includes instructions for causing the processor to extract input features for the equipment failure prediction model that are identified as predictors of equipment failure from operational data of the piece of oil or gas drilling or recovery equipment.

3. The system of claim 1, wherein the features relevant to failure prediction comprise a value for probability of failure of the piece of oil or gas drilling or recovery equipment or a value for remaining useful life of the piece of oil or gas drilling or recovery equipment.

4. The system of claim 1, wherein a size of the second sliding window is determined to generate a stable value for the threshold cutoff value used to train the equipment failure prediction model.

5. The system of claim 1, wherein the equipment failure prediction model comprises a machine-learning model that relates the recall value to the average hour-loss value to determine financial losses due to equipment failure.

6. The system of claim 1, wherein the average hour-loss value comprises a value for equipment running time lost between predicted failure of the piece of oil or gas drilling or recovery equipment and actual failure of the piece of oil or gas drilling or recovery equipment.

7. The system of claim 1, wherein the recall value comprises accuracy of the trained equipment failure prediction model in predicting equipment failures.

8. A method comprising:
processing time series data related to operation of a piece of oil or gas drilling or recovery equipment using a first sliding window to generate processed data including features relevant to failure prediction;
applying the processed data to an equipment failure prediction model;
determining a threshold cutoff value for a feature relevant to failure prediction for the piece of oil or gas drilling or recovery equipment by extracting a metric using a second sliding window to smooth an output of an equipment failure prediction model, wherein the threshold cutoff value is determined based on the metric;
applying the threshold cutoff value to the output of the equipment failure prediction model to train the equipment failure prediction model;
deriving a recall value and an average hour-loss value from the trained equipment failure prediction model;
cross validating the trained equipment failure prediction model with an embedded value optimization using a cost associated with running the piece of oil or gas drilling or recovery equipment to failure and a cost of predicting a failure too early that leads to unused life of piece of oil or gas drilling or recovery equipment;
identifying a predictive maintenance to be performed and a time for performing the predictive maintenance based on a prediction of equipment failure; and
performing the identified predictive maintenance for the piece of oil or gas drilling or recovery equipment and the time to perform the identified predictive maintenance based on the prediction of equipment failure by the cross validated and trained equipment failure prediction model.

9. The method of claim 8, further comprising:
extracting input features for the equipment failure prediction model that are identified as predictors of equipment failure from operational data of the piece of oil or gas drilling or recovery equipment.

10. The method of claim 8, wherein the feature relevant to failure prediction comprise a value for probability of failure of the piece of oil or gas drilling or recovery equipment or a value for remaining useful life of the piece of oil or gas drilling or recovery equipment.

11. The method of claim 8, wherein a size of the second sliding window is determined to generate a stable value for the threshold cutoff value used to train the equipment failure prediction model.

12. The method of claim 8, wherein the equipment failure prediction model comprises a machine-learning model that relates the recall value to the average hour-loss value to determine financial losses due to equipment failure.

13. The method of claim 8, wherein the average hour-loss value comprises a value for equipment running time lost between predicted failure of the piece of oil or gas drilling or recovery equipment and actual failure of the piece of oil or gas drilling or recovery equipment.

14. The method of claim 8, wherein the recall value comprises accuracy of the trained equipment failure prediction model in predicting equipment failures.

15. A non-transitory computer-readable medium having stored therein instructions that are executable by a processor for performing operations comprising:
processing time series data related to operation of a piece of oil or gas drilling or recovery equipment using a first sliding window to generate processed data including features relevant to failure prediction;
applying the processed time series data to an equipment failure prediction model;
determining a threshold cutoff value for a feature relevant to failure prediction for the piece of oil or gas drilling or recovery equipment by extracting a metric using a second sliding window to smooth an output of an equipment failure prediction model, wherein the threshold cutoff value is determined based on the metric;

applying the threshold cutoff value to the output of the equipment failure prediction model to train the equipment failure prediction model;

deriving a recall value and an average hour-loss value from the trained equipment failure prediction model;

cross validating the trained equipment failure prediction model with an embedded value optimization using a cost associated with running the piece of oil or gas drilling or recovery equipment to failure and a cost of predicting a failure too early that leads to unused life of piece of oil or gas drilling or recovery equipment, and identifying a predictive maintenance to be performed and a time for performing the predictive maintenance based on a prediction of equipment failure, wherein the identified predictive maintenance for the piece of oil or gas drilling or recovery equipment and the time to perform the identified predictive maintenance is based on a prediction of equipment failure by the cross validated and trained equipment failure prediction model.

16. The non-transitory computer-readable medium as defined in claim 15, further comprising instructions for performing operations including:

extracting input features for the equipment failure prediction model that are identified as predictors of equipment failure from operational data of the piece of oil or gas drilling or recovery equipment.

17. The non-transitory computer-readable medium as defined in claim 15, wherein the feature relevant to failure prediction comprise a value for probability of failure of the piece of oil or gas drilling or recovery equipment or a value for remaining useful life of the piece of oil or gas drilling or recovery equipment.

18. The non-transitory computer-readable medium as defined in claim 15, wherein a size of the second sliding window is determined to generate a stable value for the threshold cutoff value used to train the equipment failure prediction model.

19. The non-transitory computer-readable medium as defined in claim 15, wherein the equipment failure prediction model comprises a machine-learning model that relates the recall value to the average hour-loss value to determine financial losses due to equipment failure.

20. The non-transitory computer-readable medium as defined in claim 15, wherein the average hour-loss value comprises a value for equipment running time lost between predicted failure and actual failure of the piece of oil or gas drilling or recovery equipment, and the recall value comprises accuracy of the trained equipment failure prediction model in predicting equipment failures.

* * * * *